(12) United States Patent
Ohuchi et al.

(10) Patent No.: US 7,045,920 B2
(45) Date of Patent: May 16, 2006

(54) INTERCONNECTION ASSEMBLY FOR AN ELECTRIC MOTOR AND METHOD OF MAKING THE SAME

(75) Inventors: Katsuaki Ohuchi, Tokyo (JP); Katsuo Endo, Tokyo (JP); Hideo Matsuo, Tokyo (JP); Akira Kabasawa, Saitama-ken (JP); Akihiro Okamura, Saitama-ken (JP); Kazunari Takahashi, Saitama-ken (JP)

(73) Assignees: Hitachi Cable, Ltd., Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 170 days.

(21) Appl. No.: 10/643,093

(22) Filed: Aug. 19, 2003

(65) Prior Publication Data

US 2004/0066103 A1    Apr. 8, 2004

(30) Foreign Application Priority Data

Aug. 21, 2002    (JP) .............................. 2002-240741

(51) Int. Cl.
   *H02K 3/04*    (2006.01)
   *H02K 3/50*    (2006.01)
   *H02K 15/04*   (2006.01)

(52) U.S. Cl. ................... 310/71; 310/180; 310/179; 310/184

(58) Field of Classification Search ................. 310/71, 310/179, 180, 184
See application file for complete search history.

(56) References Cited

U.S. PATENT DOCUMENTS

| 3,382,316 | A | * | 5/1968 | Weiner ..................... 174/72 A |
| 4,309,634 | A | * | 1/1982 | Koroly et al. .............. 310/201 |
| 4,689,023 | A | * | 8/1987 | Strong et al. .............. 439/189 |
| 5,886,433 | A | * | 3/1999 | Oda et al. ................... 310/59 |
| 5,900,687 | A | * | 5/1999 | Kondo et al. ................ 310/71 |
| 6,271,608 | B1 | * | 8/2001 | Haydock et al. ............. 310/71 |
| 2002/0149278 | A1 | * | 10/2002 | Eydelie et al. ................ 310/71 |
| 2004/0135457 | A1 | * | 7/2004 | Holzheu et al. ............. 310/179 |

FOREIGN PATENT DOCUMENTS

| JP | 48-71301 | | 9/1973 |
| JP | 09215248 A | * | 8/1997 |
| JP | 2000-333400 | | 11/2000 |
| JP | 2002-233095 | | 8/2002 |

* cited by examiner

*Primary Examiner*—Darren Schuberg
*Assistant Examiner*—Erik Preston
(74) *Attorney, Agent, or Firm*—McGinn IP Law Group, PLLC

(57) ABSTRACT

An interconnection assembly has phase parts for U phase, V phase and W phase. The phase parts each are of a plurality of interconnection assembly parts that are connected in the form of a ring and include a conductor section to which a motor coil wire is connected, the conductor section being formed by stripping fluororesin insulation at a predetermined position, and the phase parts are partially fixedly bundled.

12 Claims, 7 Drawing Sheets

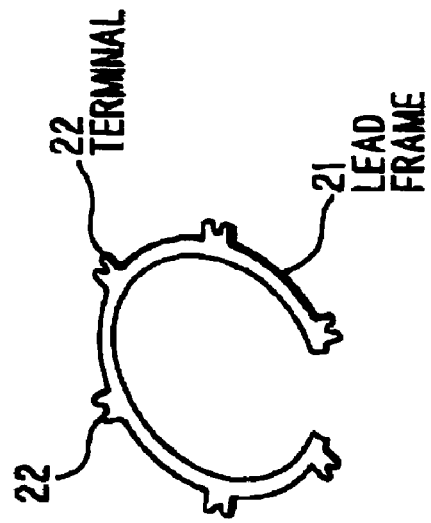
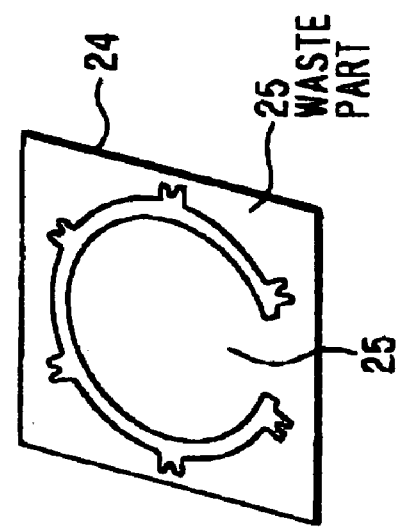
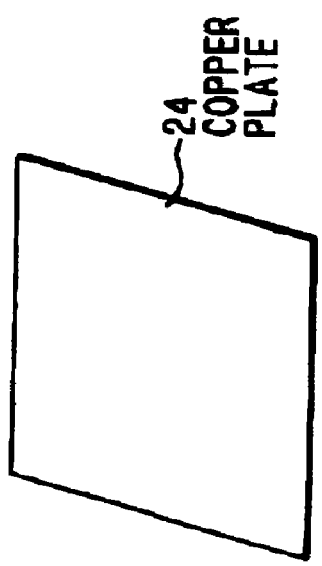

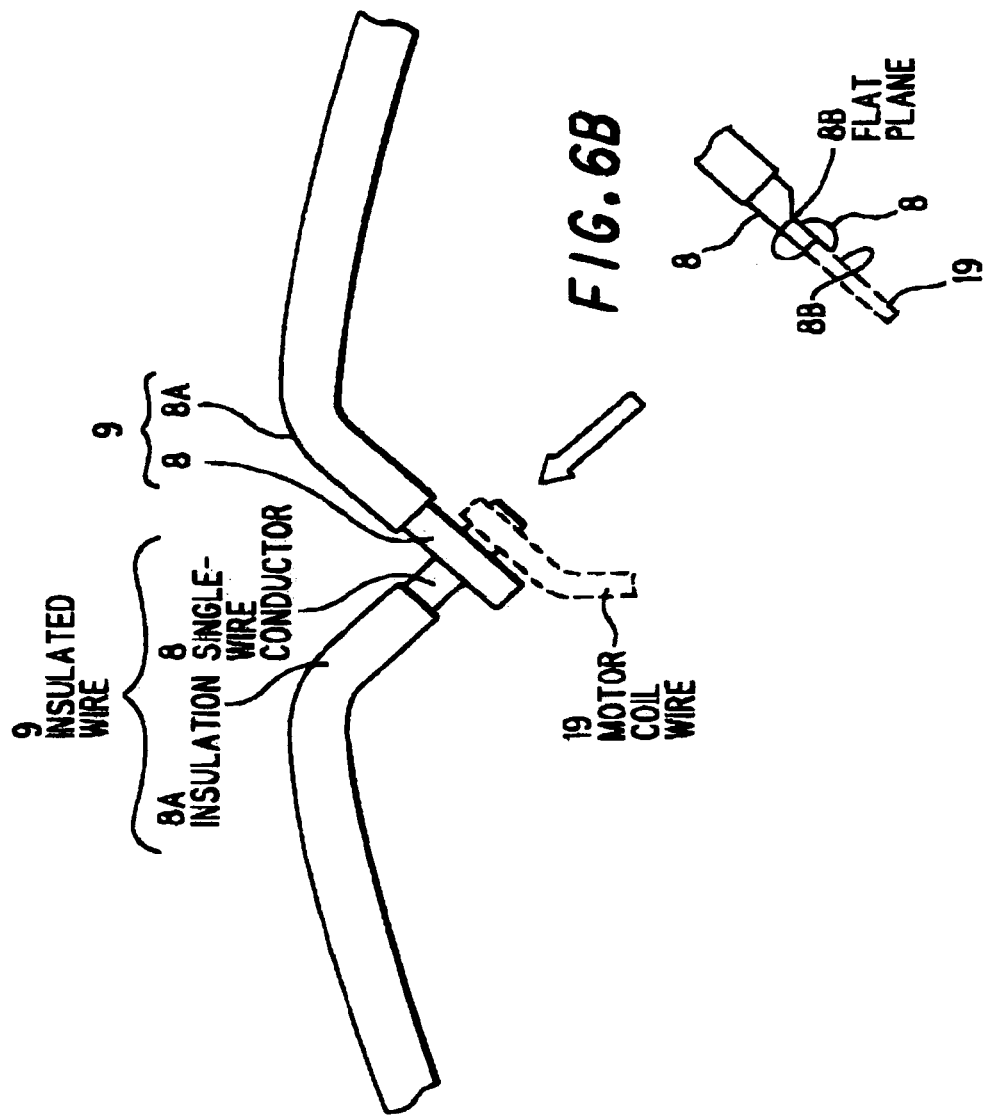

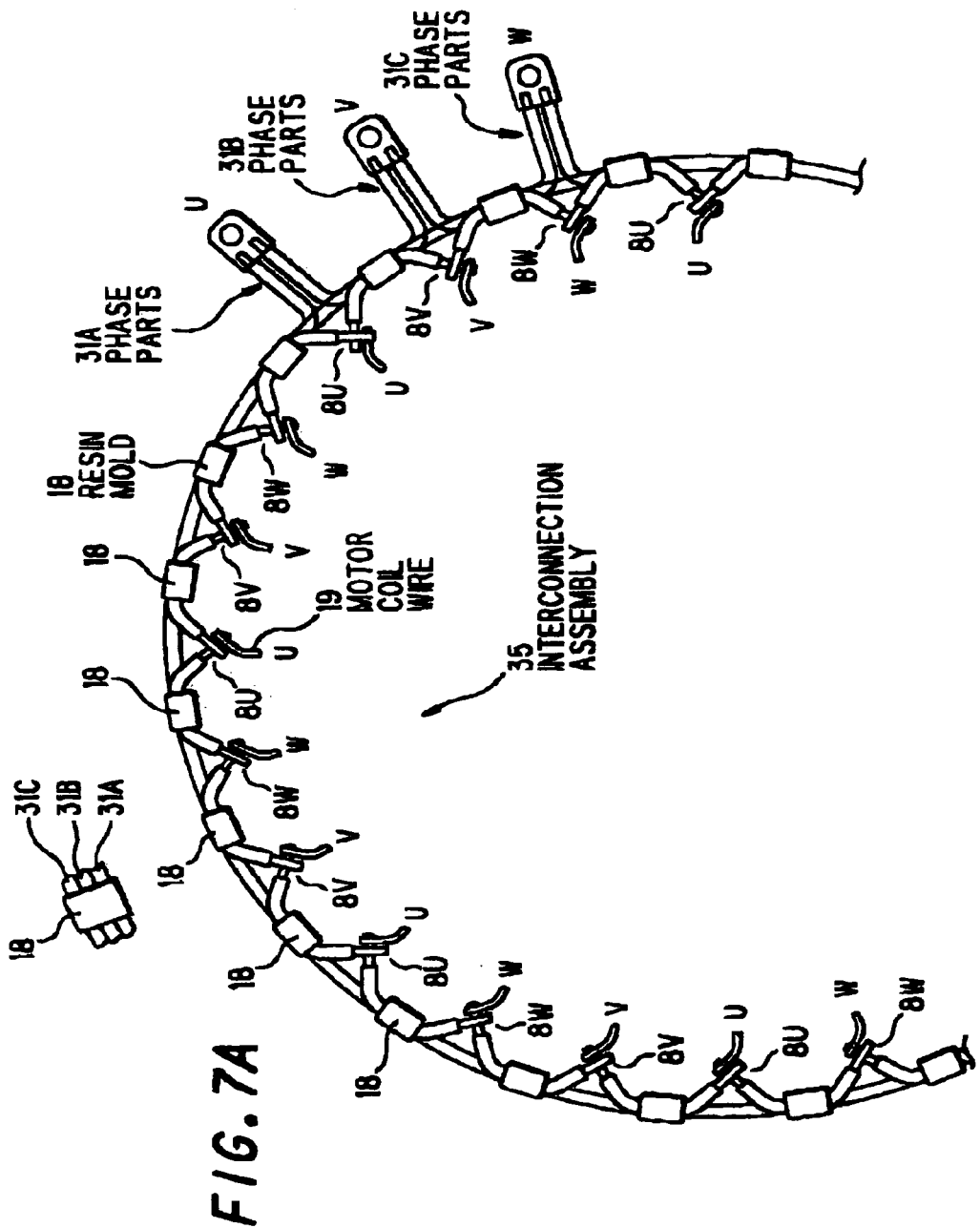

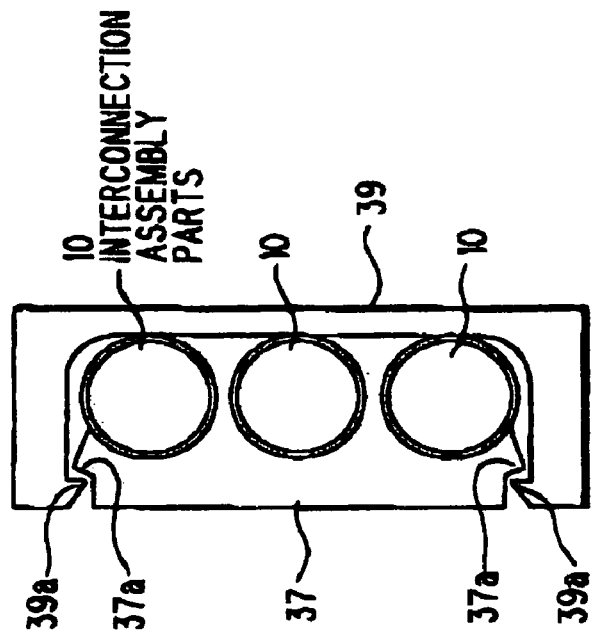
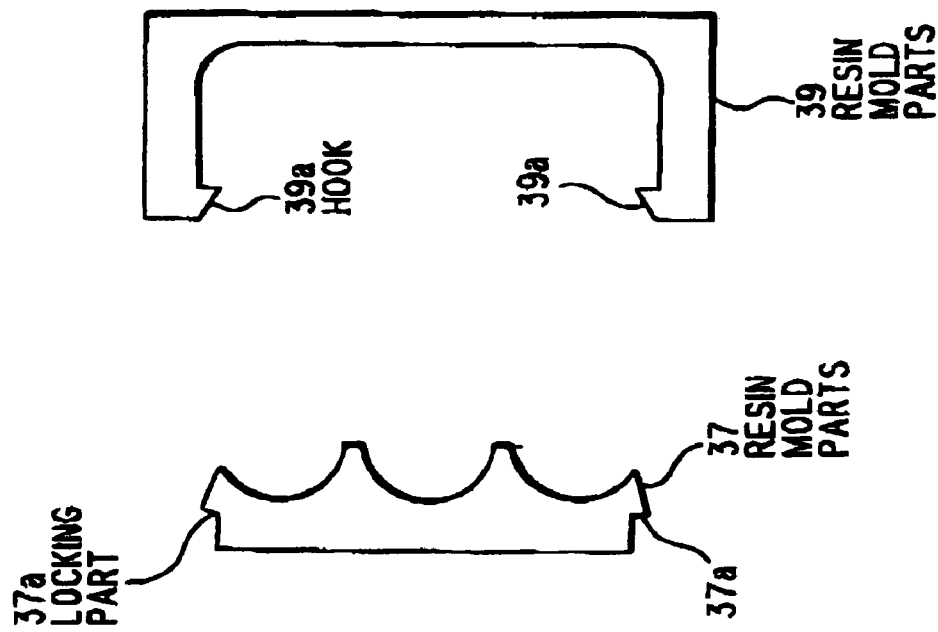

INTERCONNECTION ASSEMBLY FOR AN ELECTRIC MOTOR AND METHOD OF MAKING THE SAME

The present application is based on Japanese patent application No. 2002-240741, the entire contents of which are incorporated herein by reference.

BACKGROUND OF THE INVENTION

1. Field of the Invention

This invention relates to an interconnection assembly used for a motor of, e.g., an electric car to connect with the motor coil wire, and relates to a method of making the same.

2. Description of the Related Art

Conventional interconnection assemblies used to connect with the motor coil wire are made as follows. At first, a square copper plate 24 as shown in FIG. 1A is punched by pressing as shown in FIG. 1B, thereby giving a lead frame as shown in FIG. 1C. Then, as shown in FIG. 2, four lead frames 21 for U phase, V phase, W phase and grounding are stacked with a gap of about 0.5 to 2 mm in the vertical direction Finally, as shown in FIG. 3, the lead frame 21 is placed in a molding die (not shown) and is then molded with super-engineering molding resin 27.

The motor coil wire (not shown) is connected to a terminal 22 of the lead frame 21. The connecting method available is in general spot welding (fusing), soldering etc. The super-engineering molding resin available is polyphenylsulfide (PPS), liquid crystalline polymer (LCP) etc.

In FIG. 3, of twelve terminals 22, six terminals are for grounding and each two of the remaining six terminals are assigned to U phase, V phase and W phase. 23, 23 and 23 are terminal connectors for U phase, V phase and W phase.

If in a large motor the diameter of stator becomes greater than 150 mm, the dimension of interconnection assembly to be used increases and the amount of current to be flown increases. Because of this, temperature of the lead frame 21 rises and temperature of the molded resin 27 also rises. In this case, there occurs a large strain between the copper lead frame 21 and the PPS resin 27 since resin 27 around the lead frame 21 is closely contacting the lead frame 21 due to a high injection pressure in molding and there is a difference in linear expansion coefficient between the copper lead frame 21 and the PPS resin 27.

In motors, especially then it starts and during the normal operation, the current-carrying capacity changes severely. Thus, when the current-carrying capacity changes severely, there may occur a crack in the molded resin 27 that is mechanically weak and has a great expansion coefficient and, therefore, the insulation performance may be broken.

Furthermore, as shown in FIG. 1B, when the copper plate 24 is punched by pressing or cut, waste part 25 is necessarily generated. Thus, loss of material increases and lowering of yield causes an increase in manufacturing cost. Especially in large interconnection assembly, the waste part 25 further increases since the copper plate 24 must have a greater size and thickness.

SUMMARY OF THE INVENTION

It is an object of the invention to provide an interconnection assembly that can suppress strain caused by a difference in thermal expansion between lead frame and molded resin.

It is another object of the invention to provide an interconnection assembly that waste part in manufacturing the lead frame can be reduced.

According to a first aspect of the invention, an interconnection assembly comprises:

phase parts for U phase, v phase and W phase, wherein the phase parts each include a conductor section to which a motor coil wire is connected, the conductor section being formed by stripping fluororesin insulation at a predetermined position, and the phase parts are partially fixedly bundled.

According to a second aspect of the invention, an interconnection assembly comprises:

phase parts for U phase, V phase and W phase, wherein the phase parts each are composed of a plurality of interconnection assembly parts that are connected in the form of a ring and include a conductor section to which a motor coil wire is connected, the conductor section being formed by stripping fluororesin insulation at a predetermined position, and the phase parts are partially fixedly bundled.

According to a third aspect of the invention, an interconnection assembly comprises the steps of:

stripping a fluororesin insulation at a predetermined position to expose a conductor section to form an interconnection assembly parts;

connecting a plurality of the interconnection assembly parts at the conductor section each other to form phase parts for U phase, V phase and W phase;

bundling partially fixedly the phase parts for U phase, V phase and W phase.

BRIEF DESCRIPTION OF THE DRAWINGS

The preferred embodiments according to the invention will be explained below referring to the drawings, wherein:

FIGS. 1A to 1C are perspective views showing a method of making the conventional interconnection parts (lead frame);

FIG. 6A is an enlarged plain view showing the connecting part among two interconnection assembly parts 10 and motor coil wire 19;

FIG. 6B is a side view showing the connecting part in FIG. 6A viewing in the direction of an arrow in FIG. 6A;

FIG. 7A is a plain view showing part of an interconnection assembly in the embodiment;

FIG. 7B is a top view showing a partially formed resin mold 18 in FIG. 7A;

FIG. 8A is a broken plain view showing resin mold parts 37, 39 used instead of the resin mold 18 in FIG. 7B; and FIG. 8B is a plain view showing the assembled resin mold parts 37, 39 in FIG. 8A.

DETAILED DESCRIPTION OF THE PREFERRED EMBODIMENTS

Figure 2:
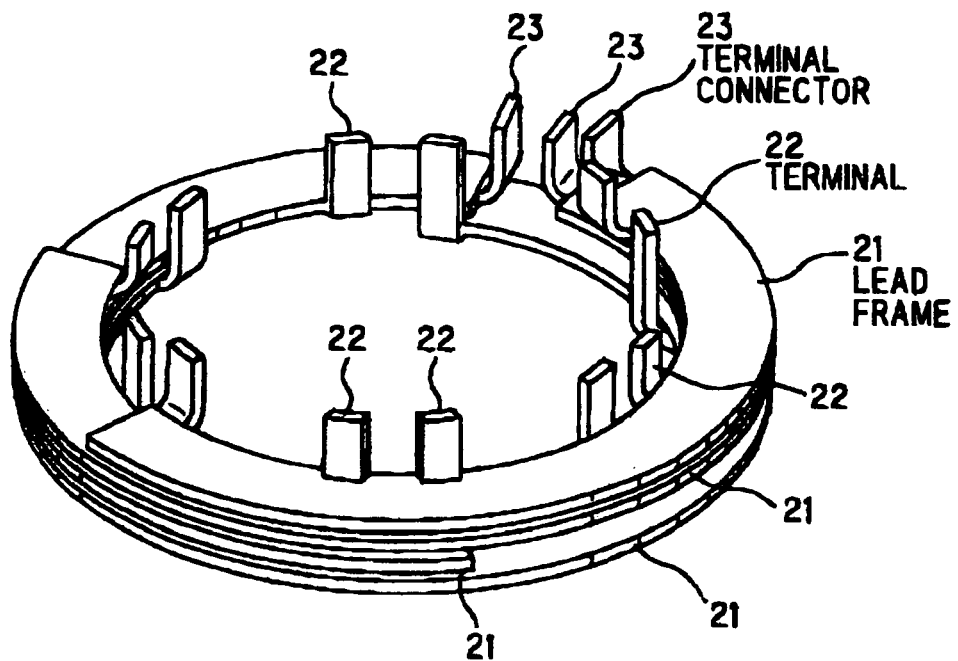
FIG. 2 is a perspective view showing stacked lead frames in constructing the conventional interconnection assembly.
Figure 3:
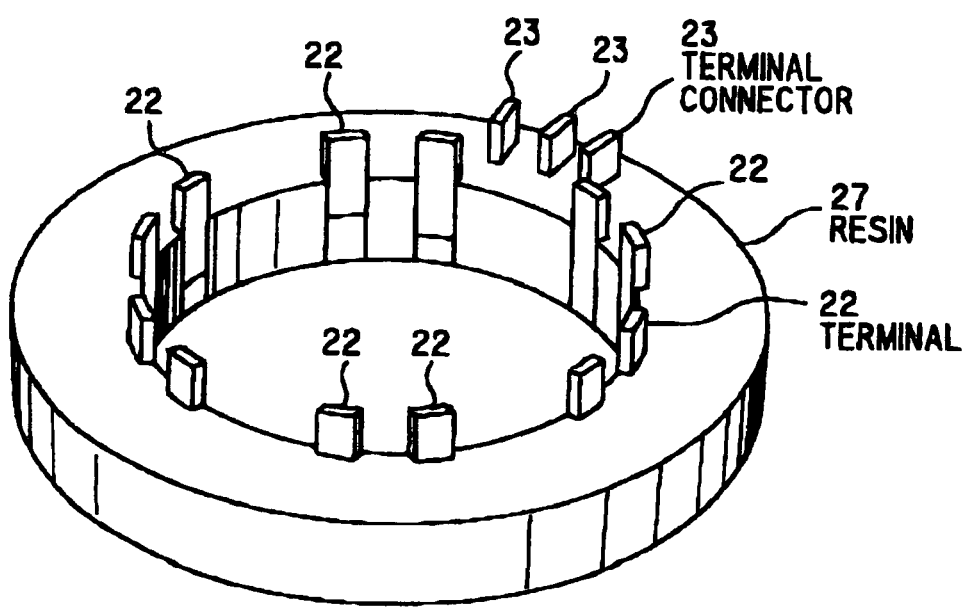
FIG. 3 is a perspective view showing the conventional interconnection assembly molded with resin.
Figure 4:
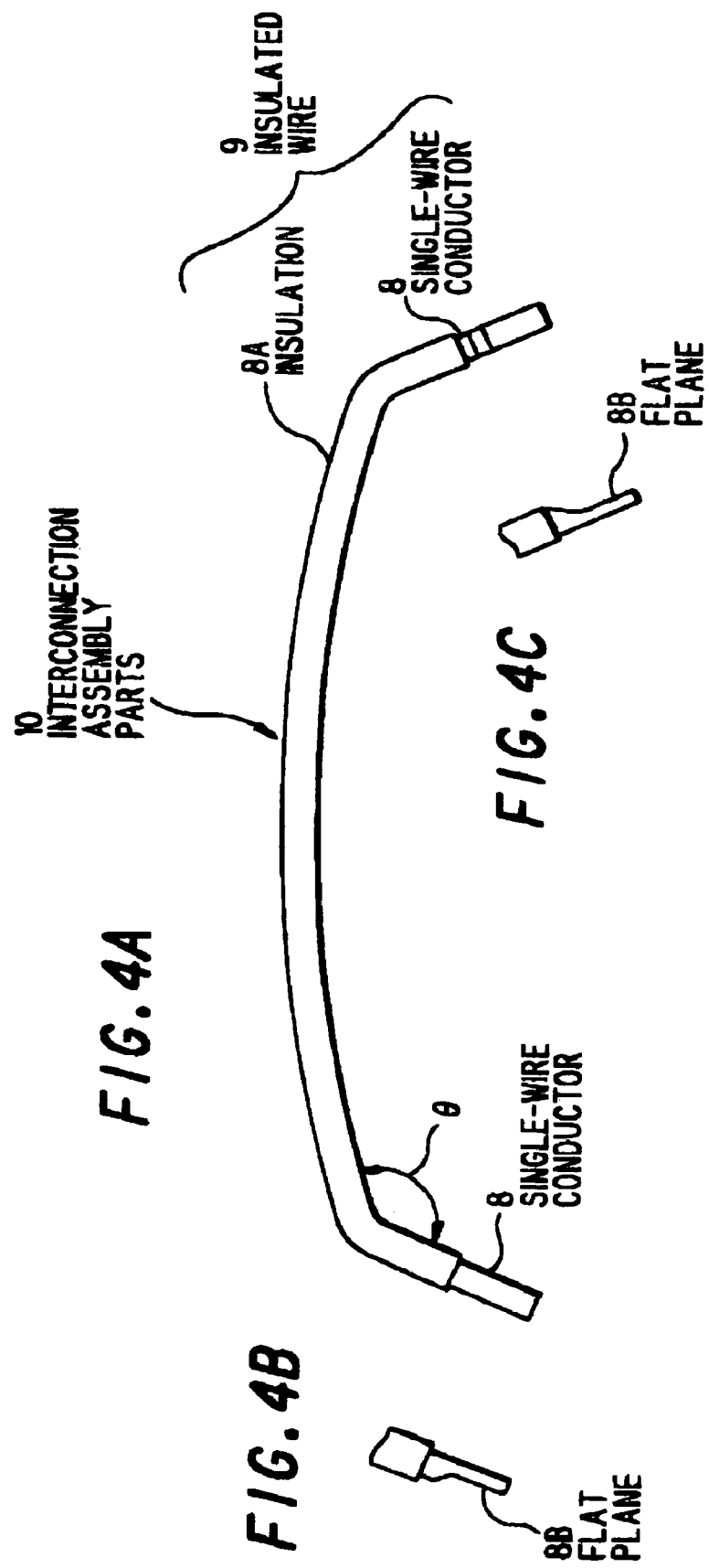
FIG. 4A is a plain view showing an interconnection assembly parts in a preferred embodiment according to the invention.
FIGS. 4B and 4C are side views showing end part of the interconnection assembly parts in FIG. 4A.

FIG. 4A is a plain view showing an interconnection assembly parts in the preferred embodiment according to the invention In FIG. 4A, 10 indicates an interconnection assembly parts. The interconnection assembly parts 10 is made by cutting a predetermined length of an insulated wire 9 that is of a single-wire conductor 8 covered with a fluororesin insulation 8A (e.g., PFA, PTFE, ETFE, PEP and PVTF), removing the fluororesin insulation 8A at both ends of the insulated wire 9 to expose the single-wire conductor 8, folding the exposed ends to have a predetermined angle θ.

The insulated wire 9 is desirably of the single-wire conductor 8 with a diameter of 1 to 5 mm with the fluororesin insulation 8A.

FIGS. 4B and 4C are side views showing end part of the interconnection assembly parts in FIG. 4A.

As shown in FIGS. 4A and 4B, the single-wire conductor 8 with the exposed ends is, for facilitating the welding on the subsequent stage, pressed to have the ends formed into a flat plane 8B.

Figure 5:
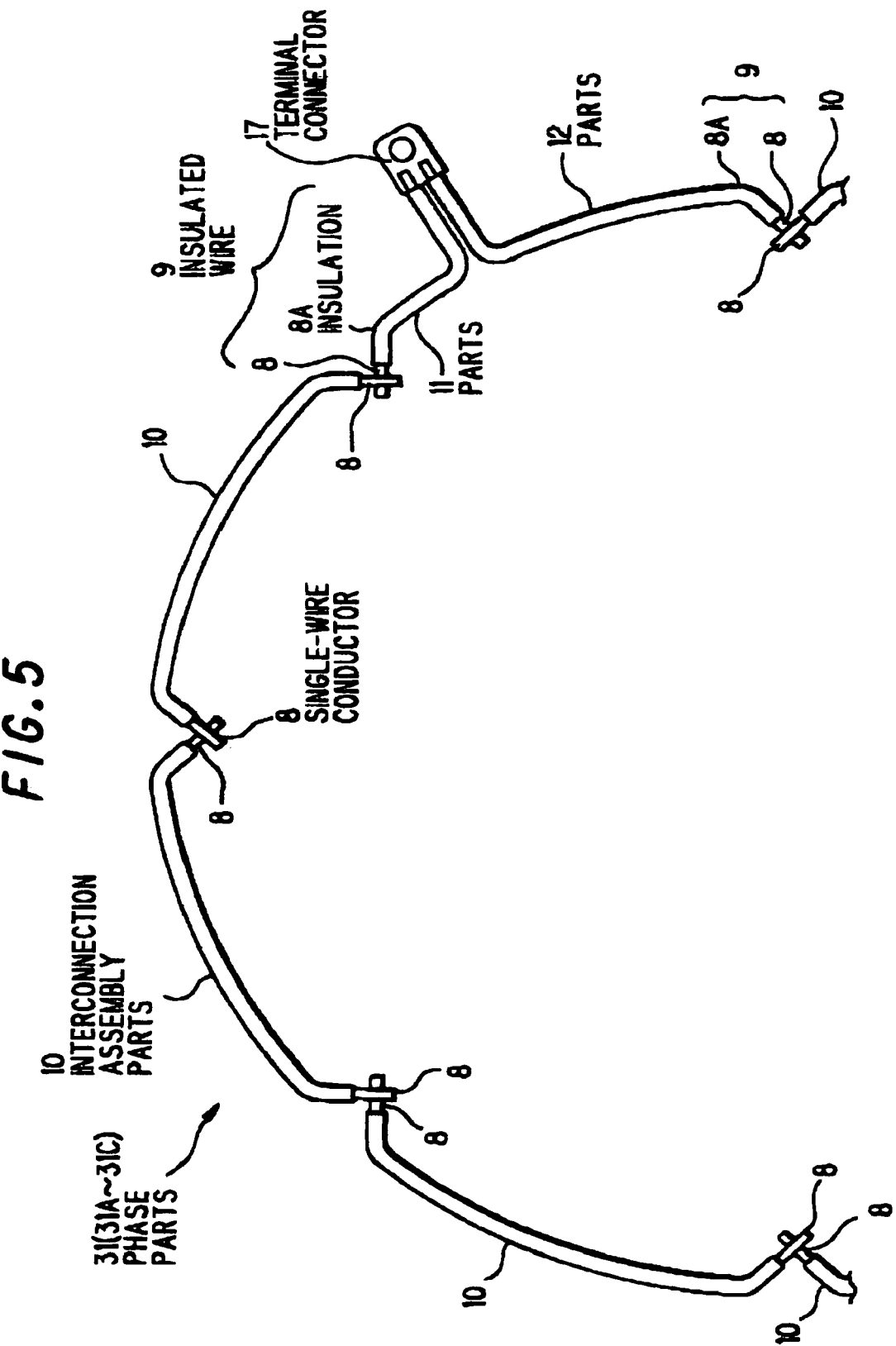
FIG. 5 is a plain view showing a phase parts formed by bundling a plurality of the interconnection assembly parts in the embodiment.

FIG. 5 is a plain view showing a phase parts formed by bundling a plurality of the interconnection assembly parts in the embodiment.

As shown in FIG. 5, the phase parts 31 is composed such that seven interconnection assembly parts 10 (FIG. 4A) and two parts 11, 12 with different shape from the interconnection assembly parts 10 are connected in the form of a ring (in FIG. 5, only part of the ring is shown). The two parts 11, 12 are, like the method of making the interconnection assembly parts 10, made by cutting a predetermined length of an insulated wire 9 that is of the single-wire conductor 8 covered with the fluororesin insulation 8A, removing the fluororesin insulation 8A at both ends of the insulated wire 9 to expose the single-wire conductor 8, folding the parts 11 to be dogleg and the parts 12 to be S-shaped. The one-side ends of the parts 11, 12 extending outside from the ring compose a terminal conductor 17.

FIG. 6A is an enlarged plain view showing the connecting part among two interconnection assembly parts 10 and motor coil wire 19. FIG. 6B is a side view showing the connecting part in FIG. 6A viewing in the direction of an arrow in FIG. 6A. As shown in FIGS. 6A and 6B, the single-wire conductors 8 of neighboring interconnection assembly parts 10 are jointed by fusing welding while overlapping the flat planes 8B.

FIG. 7A is a plain view showing an interconnecting assembly in this embodiment. FIG. 7B is a top view showing a partially formed resin mold 18 in FIG. 7A.

As shown in FIG. 7A, three phase parts 31A to 31C with the same construction as shown in FIG. 5 are provided in the interconnection assembly 35 and correspond to U phase, V phase and W phase, respectively. The interconnection assembly 35 (in FIG. 7A, only part of ring is shown) is configured such that the V phase parts 31B is 15° displaced with reference to the U phase parts 31A, the W phase parts 31C is 30° displaced with reference to the U phase parts 31A, and the U. V and W phase parts 31A to 31C are integrally bundled by partial resin molds 18 that are provided on the entire ring at given intervals.

In FIG. 7A, 8U corresponds to a conductor of the U phase parts 31A, 8V corresponds to a conductor of the V phase parts 31B, and 8W corresponds to a conductor of the W phase parts 31C. The conductors 8U, 8V and 8W are formed protruding inside the U, V and W phase parts 31A, 31B and 31C, respectively.

Although not shown, it is necessary to provide a ground phase parts other than the phase parts 31A, 31B and 31C. The ground phase parts are desirably composed such that they are formed similarly to the configuration of the conductors of the phase parts 31A, 31B and 31C and are integrally bundled by the resin molds 18.

In FIG. 7A, the conductors 8U of the phase parts 31A, the conductors 8V of the phase parts 31B and the conductors 8W of the phase parts 31C each are eight and, therefore, eight motor coil wires 19 can be connected for U, V and W phases, respectively.

The motor coil wire 19 is, as shown in FIG. 6B, connected with the flat plane 8B of the conductor of one phase parts 31 by fusing welding.

FIG. 5A is a broken plain view showing resin mold parts 37, 39 used instead of the resin mold 18 in FIG. 7B. FIG. 8B is a plain view showing the assembled resin mold parts 37, 39 in FIG. 8A. The resin mold parts 37, 39 may be used instead of the resin mold 18. In assembling, as shown in FIG. 8B, three interconnection assembly parts 10, 10 and 10 are sandwiched between the resin mold parts 37 and 39, and then locking parts 37a of one resin mold parts 37 are interlocked with hooks 39a of the other resin mold parts 39.

In this embodiment, both ends of insulated wire 9 with single-wire conductor 8 are stripped and folded, and then the two insulated wires 9 thus prepared are connected at the stripped ends, and then a plurality of the insulated wires 9 thus connected are arranged to form a ring and are partially integrally bundled by molding. In this case, since the conductors 8 are covered with the insulation 8A, it is not necessary to mold the entire ring with resin like the conventional interconnection assembly. Thus, the resin mold 18 is not used for insulation but for fixing integrally the interconnection assembly, parts 10 to facilitate the welding connection with the motor coil wire 19. Therefore, the resin mold 18 only has to be formed partially. Even when there occurs a stretch or shrinkage in the conductor 8 due to a severe current-carrying cycle, neither strain nor crack generates since there exists a free space and it is extensible. Furthermore, different from the conventional method of punching the copper plate, the insulated wires 9 only has to be folded. Therefore, the waste part is little generated and the resource can be saved by that much.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An interconnection assembly, comprising:
   phase parts for U phase, V phase and W phase,
   wherein said phase parts each comprise a plurality of interconnection assembly parts that are connected in the form of a ring and comprise a plurality of individual insulated wires that each comprise a single-wire conductor and a fluororesin insulation formed on said single-wire conductor,
   said plurality of individual insulated wires each comprise a conductor section with said fluororesin insulation stripped at an end thereof, and
   said plurality of individual insulated wires are electrically connected to each other at said conductor section to which a motor coil wire is connected.

2. The interconnection assembly according to claim 1, wherein:
   said single-wire conductor comprises a diameter of 1 to 5 mm.

3. The interconnection assembly according to claim 1, wherein:
   said conductor section is protruded inside said ring.

4. The interconnection assembly according to claim 1, wherein:
  said single-wire conductor comprises a flat plane at an end thereof, and
  said plurality of individual insulated wires are electrically connected to each other through said flat plane.

5. The interconnection assembly according to claim 1, wherein: said fluororesin insulation comprises PFA, PTFE, ETFE, FEP or PVTF.

6. The interconnection assembly according to claim 1, wherein:
  said phase parts are partially fixedly bundled.

7. The interconnection assembly according to claim 1, wherein:
  said phase parts are partially fixedly bundled with resin molding.

8. The interconnection assembly according to claim 1, wherein:
  said plurality of individual insulated wires each comprise said conductor section being folded.

9. The interconnection assembly according to claim 1, wherein:
  said phase parts are partially fixedly bundled with a locking member.

10. A method of making an interconnection assembly, comprising:
  providing a plurality of individual insulated wires that each comprise a single-wire conductor and a fluororesin insulation formed on said single-wire conductor;
  stripping a fluororesin insulation at an end of said plurality of individual insulated wires to expose a conductor section to form interconnection assembly parts; and
  electrically connecting a plurality of said interconnection assembly parts at said conductor section to each other to form phase parts for U phase, V phase and W phase.

11. The method of making an interconnection assembly according to claim 10, wherein:
  said plurality of said interconnection assembly parts are connected in the form of a ring and said conductor section is protruded inside said ring.

12. The method of making an interconnection assembly according to claim 10, further comprising:
  bundling partially fixedly said phase parts for U phase, V phase and W phase.

* * * * *